(12) United States Patent
Wang et al.

(10) Patent No.: US 8,089,637 B2
(45) Date of Patent: Jan. 3, 2012

(54) APPARATUS FOR DETECTING A SAMPLE

(75) Inventors: You-Jin Wang, Milpitas, CA (US);
Jianxin Wu, San Jose, CA (US)

(73) Assignee: Hermes Microvision, Inc., Hsinchu (TW)

( * ) Notice: Subject to any disclaimer, the term of this patent is extended or adjusted under 35 U.S.C. 154(b) by 346 days.

(21) Appl. No.: 12/344,328

(22) Filed: Dec. 26, 2008

(65) Prior Publication Data

US 2010/0165346 A1    Jul. 1, 2010

(51) Int. Cl.
*G01B 11/14* (2006.01)
(52) U.S. Cl. ....................................... 356/614
(58) Field of Classification Search .................. 356/614, 356/601, 244
See application file for complete search history.

(56) References Cited

U.S. PATENT DOCUMENTS

| | | | | |
|---|---|---|---|---|
| 6,509,969 | B1 * | 1/2003 | Takeshita et al. | 356/399 |
| 7,324,217 | B2 * | 1/2008 | Herrmann et al. | 356/606 |
| 7,728,989 | B2 * | 6/2010 | Doherty et al. | 356/614 |
| 2005/0248774 | A1 * | 11/2005 | Herrmann et al. | 356/601 |

* cited by examiner

*Primary Examiner* — Roy M Punnoose
(74) *Attorney, Agent, or Firm* — Rosenberg, Klein & Lee

(57) ABSTRACT

An apparatus for effectively detecting and calibrating a sample of examination system. The apparatus has an optical-electronic assembly for detection of the sample initiated with a light projected to the sample and an elastic supporting assembly for providing motion freedoms to adjust the relative geometric conditions between the optical-electronic assembly and the sample. The elastic supporting assembly has a planer structure and a cubic structure, and provides both motion freedoms on a plane and motion freedoms vertical to the plane. The optics electricity optical-electronic assembly could analyze the received reflected light to get geometric information of the sample, and could adjust the light used to detect the sample.

36 Claims, 11 Drawing Sheets

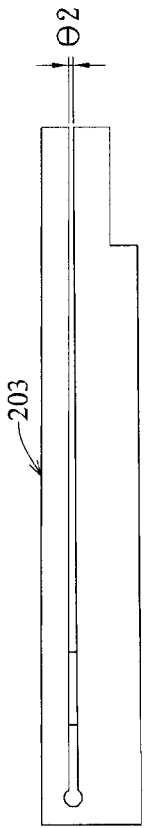
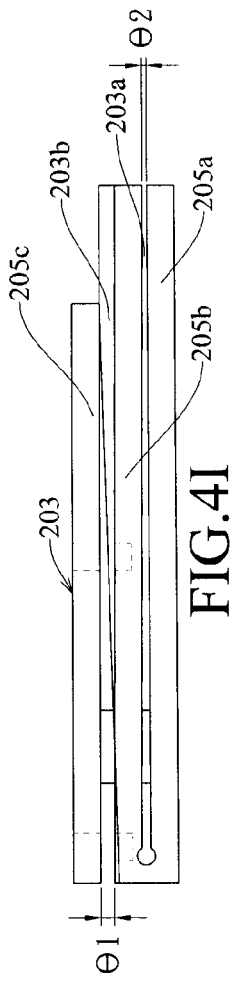
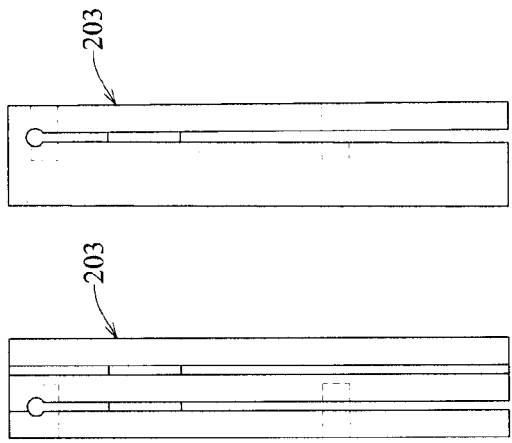
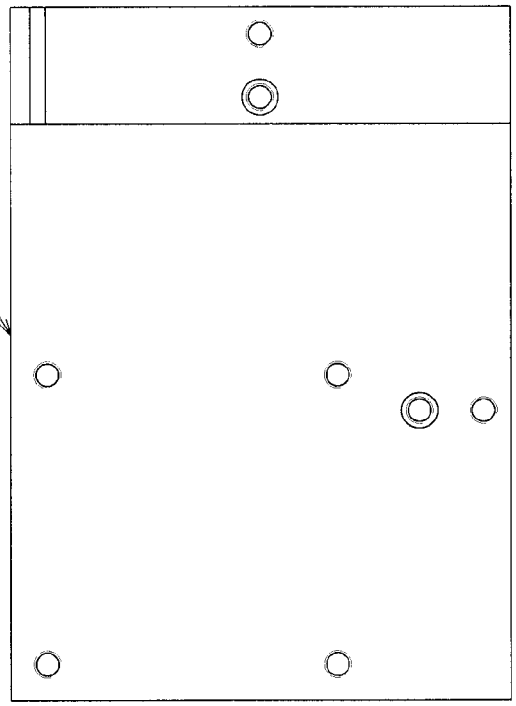

APPARATUS FOR DETECTING A SAMPLE

FIELD OF THE INVENTION

The present invention relates to a detecting apparatus, and more particularly, to a detecting apparatus capable of precisely detecting and calibrating the geometric information of a sample.

BACKGROUND OF THE RELATED ART

The critical dimension of semiconductor device is continuously decreased, such that the damage induced by any defect on a chip is continuously increased. Hence, high resolution examination (both review and inspection) is required to properly find and check the defect. For example, scanning electron microscope (SEM), as a more advanced examination system, is popularly used for examining chips. In general, a sample (wafer or photomask or semiconductor substrate) is located under a charged particle beam during the examination process. Clearly, whether the sample is correctly located is a key factor of the examining result. In general, one detector is located under the sample and on a base (such as the Z-stage of SEM). The detector will project or emit a light to the sample and analyze a reflected light from the sample. According to the analyzing result, the detector could acquire the geometric information (such as position, direction and angle) of the sample.

There are some drawbacks in the conventional design of the examination system. First, the detector is fixed on the base. Hence, once the base is improperly located (such as the top surface of the base is not parallel to the bottom surface of the sample located on a predetermined position), the detector usually can not properly detect the sample (such as the light is not properly projected from the detector onto the sample, such that the quality of the reflected light is degraded.) Second, only one detector is used to detect the geometric information of the sample. Hence, once the sample has a displacement around the light (or around an axis parallel to the light), the detector usually can not find the displacement.

Therefore, it is desired to develop some new designs of examination system to improve the above drawbacks.

SUMMARY OF THE INVENTION

An apparatus for detecting the geometric information of a sample in an examination system. The apparatus includes an elastic supporting assembly and an optical-electronic assembly. The optical-electronic assembly could project a light beam to the sample, receive a reflected light beam from the sample, and analyze the received reflected light beam to acquire messages about the geometric information (such as position, direction, and tilt angle) of the sample. The elastic supporting assembly could fix the optical-electronic assembly on a base (such as the Z-stage) and adjust the geometric condition of the optical-electronic assembly (such as moving along X-axis, moving along Y-axis, rotating on X-Y plane, tilting on X-Z plane and tilting on Y-Z plane.)

An application of the proposed detecting apparatus is exemplified herein. By adjusting the elastic supporting assembly, the geometric condition of the optical-electronic assembly could be adjusted, for example, the distance between optical-electronic assembly and sample and/or the direction of the light projected by the optical-electronic assembly. Thus, after the geometric condition of the optical-electronic assembly is adjusted to achieve an optimal reflected light from the sample, the elastic supporting assembly could be locked to fix geometric condition of the optical-electronic assembly corresponding to the base. After that, whenever a new sample is appeared to be detected, by comparing the difference(s) between the new reflected light and the optimal reflected light, it is easy to adjust the geometric condition of the new sample, until the new reflected light also is optimized. Moreover, when the examination system (such as SEM) is maintained, the apparatus also could be used to calibrate the relative geometric relation (such as relative distance, relative angle and relative direction) between the base (such as Z-stage) and the sample to be tested. For example, when the location of the sample is not changed but the location of the base might be changed during the maintain process, the apparatus could be used to calibrate the location of the maintained base by comparing the difference(s) between the new reflected light and the optimal reflected light.

Another application of the proposed detecting apparatus is exemplified herein. Because the proposed apparatus usually only projects a light to the sample along only one direction (such as Z-axis), the proposed apparatus only can detect the displacement (or motion) that has a non-zero displacement (or motion) along the direction but can not detect displacement (or motion) totally on a plane vertical to the direction (such as X-Y plane). Therefore, to effectively detect the displacement (or motion) of the sample, it is worth to use two apparatuses that separately projects lights to the sample along two different directions (such as one along X-axis and another along Y-axis).

Some optional improvements of the proposed apparatus are exemplified herein. The elastic supporting assembly could comprise a planar structure and cubic structure. The planar structure may make a restricted linear motion and/or restricted pivot motion relative to a base where the proposed apparatus is located. The cubic structure may make a restricted deformation. Hence, the optical-electronic assembly on the elastic supporting apparatus could be linear moved, pivot moved or tilted.

Some optional improvements of the proposed apparatus are exemplified herein. The optical-electronic assembly could comprise a light source module and an analyzing module. The optical-electronic assembly also could have other improvements, such as beam-splitting module, automatic gain control circuit, background eliminating circuit, and so on. Hence, not only the receive light could be effectively analyzed, but also the generation of light and elimination of noise could be effectively adjusted.

These and other aspects, features and advantages of the present invention can be further understood from the accompanying drawings and description of embodiments.

BRIEF DESCRIPTION OF THE DRAWINGS

FIG. 4G, FIG. 4H, FIG. 4I, FIG. 4J, and FIG. 4K are top, a first side, a second side, a third side, and a fourth side views respectively of FIG. 4A when in operation in accordance with one embodiment of the present invention.

DETAILED DESCRIPTION OF THE INVENTION

Figure 1:
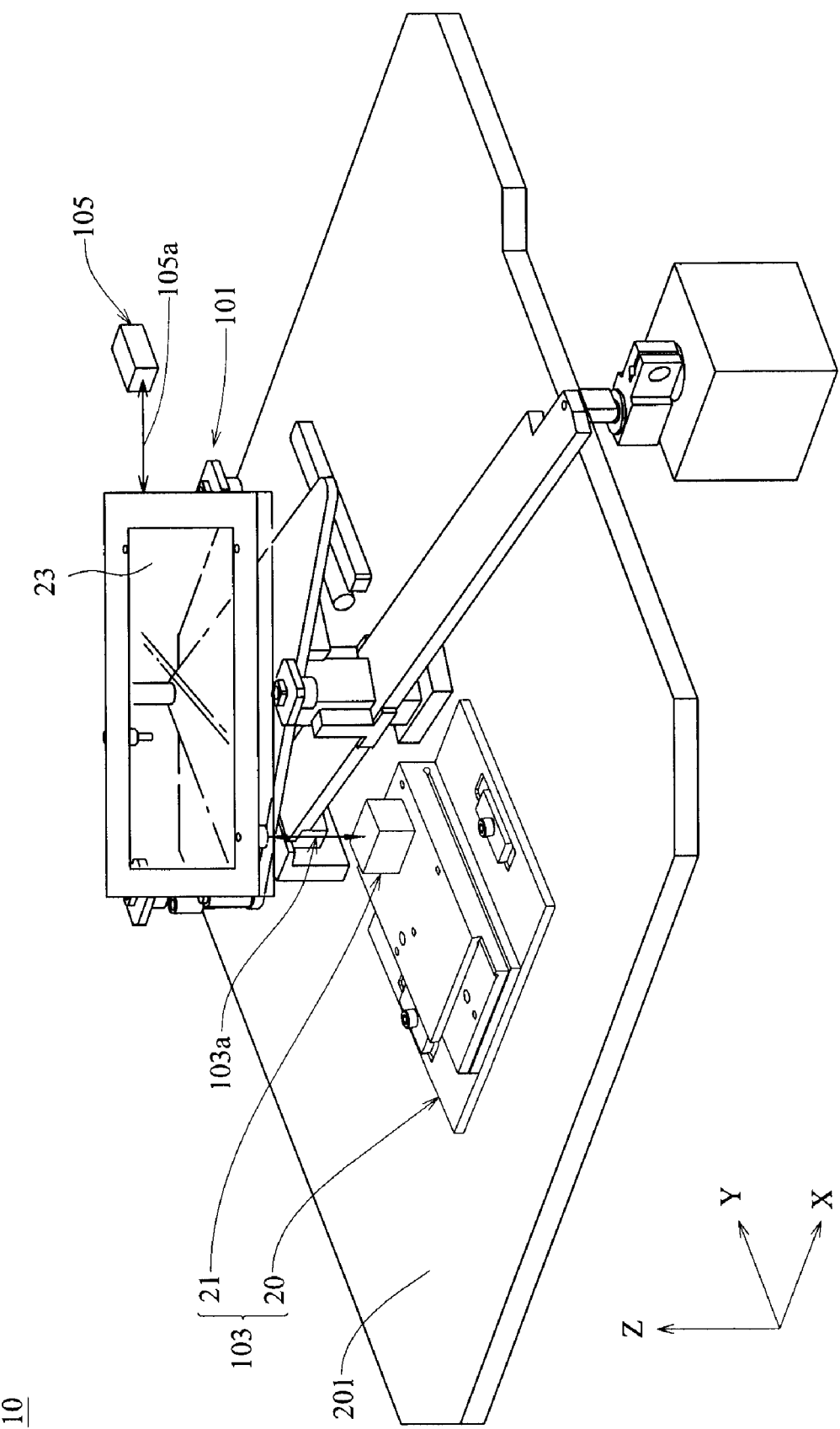
FIG. 1 is a schematic side-view diagram illustrating a system for detecting the geometric information of a sample in accordance with one embodiment of the present invention.

FIG. 1 is a schematic side-view diagram illustrating a system for detecting the geometric information of a sample in accordance with one embodiment of the present invention. The exemplary system 10 comprises a holding apparatus 101 and at least one detecting apparatus 103. The holding apparatus 101 is configured for holding a sample 23. The detecting apparatus 103 separated from the sample 23 is for detecting the geometric information of the sample 23. The detecting apparatus 103 comprises an elastic supporting assembly 20 and an optical-electronic assembly 21. The optical-electronic assembly 21 projects a light beam 103a on the sample 23, and then receives a reflected light beam 103a from the sample 23 and analyzes the reflected light beam 103a. The elastic supporting assembly 20 supports the optical-electronic assembly 21, fixes the optical-electronic assembly 21 to a base 201 (such as fixing on the top surface of the Z-stage) and adjusts a relative geometric relation (such as relative distance, relative angle and relative direction) between the optical-electronic assembly 21 and the sample 23. Therefore, by using the elastic supporting assembly 20 to adjust the geometric condition of the optical-electronic assembly 21, the light path of the light beam 103a can be adjusted to optimize the quality of the received reflected light beam 103a.

As an example, the exemplary system 10 is equipped with a first detecting apparatus 103 for detecting the displacement/motion of the sample 23 on an X-Y plane. A second detecting apparatus 105 may be set such that a second light beam 105a is projected on another surface (such as the side of the sample 23) allowing the second detecting apparatus 105 to detect the position variation of the sample 23 on an X-Z plane or a Y-Z plane. In other words, because the sample 23 is a 3-dimensional object having a first edge, a second edge, and a third edge crossing a specific vertex of the sample 23, at least two detecting apparatus 103/105 may be used to separately detect different displacements/motions of the sample 23. For example, one detecting apparatus 103 which projects a light beam is used for detecting the displacement/motion on one plane defined by the first edge and the second edge, and another detecting apparatus 105 which projects another light beam is used for detecting the displacement/motion on another plane defined by the first edge and the third edge. Of course, the shape of the sample 23 is not restricted. Therefore, the first edge and the second edge could be the same edge if the shape of the surface defined by the first edge and the second edge is chosen from a group consisting of the following: circle, ellipse, oval, and combination thereof.

Figure 2:
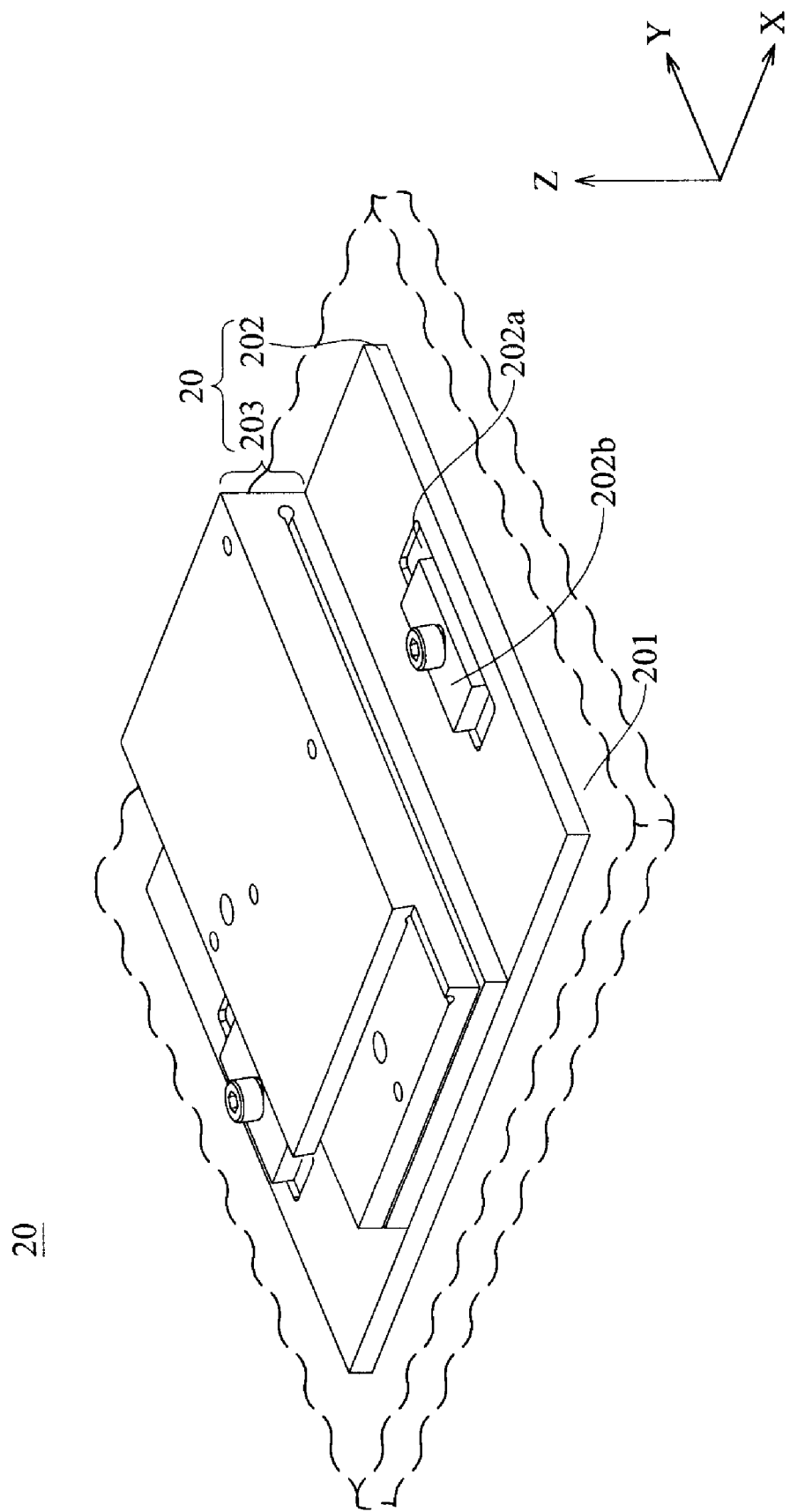
FIG. 2 is a schematic side-view diagram illustrating an elastic supporting assembly in accordance with one embodiment of the present invention.

FIG. 2 is a schematic side-view diagram illustrating an elastic supporting assembly in accordance with one embodiment of the present invention. The elastic supporting assembly 20 comprises a planar structure 202 and a cubic structure 203. The optical-electronic assembly (not shown in the figure) may be loaded and fixed on the elastic supporting assembly 20. In one option, the planar structure 202 is positioned between the base and the cubic structure 203. Herein, the area between the planar structure 202 and the base is larger than the area between the cubic structure 203 and the planar structure 202, such that the cubic structure 203 is fixed on the base through the planar structure 202. Alternatively, the cubic structure 203 may be positioned between the base and the planar structure 202. Herein, the area between the cubic structure 203 and the base is larger than the area between the planar structure 202 and the cubic structure 203, such that the planar structure 202 is fixed on the base 201 through the cubic structure 203. Clearly, the key is how to use both the planar structure 202 and the cubic structure 203 to provide the required motion freedom, how to combine the planar structure 202 and the cubic structure 203 is not a key of the invention. As an example, the planar structure 202 could be mounted with the cubic structure 203 by a way selected from a group consisting of the following: screw, glue, nail, tack, electric welding, and combination therefore.

Figure 3A:
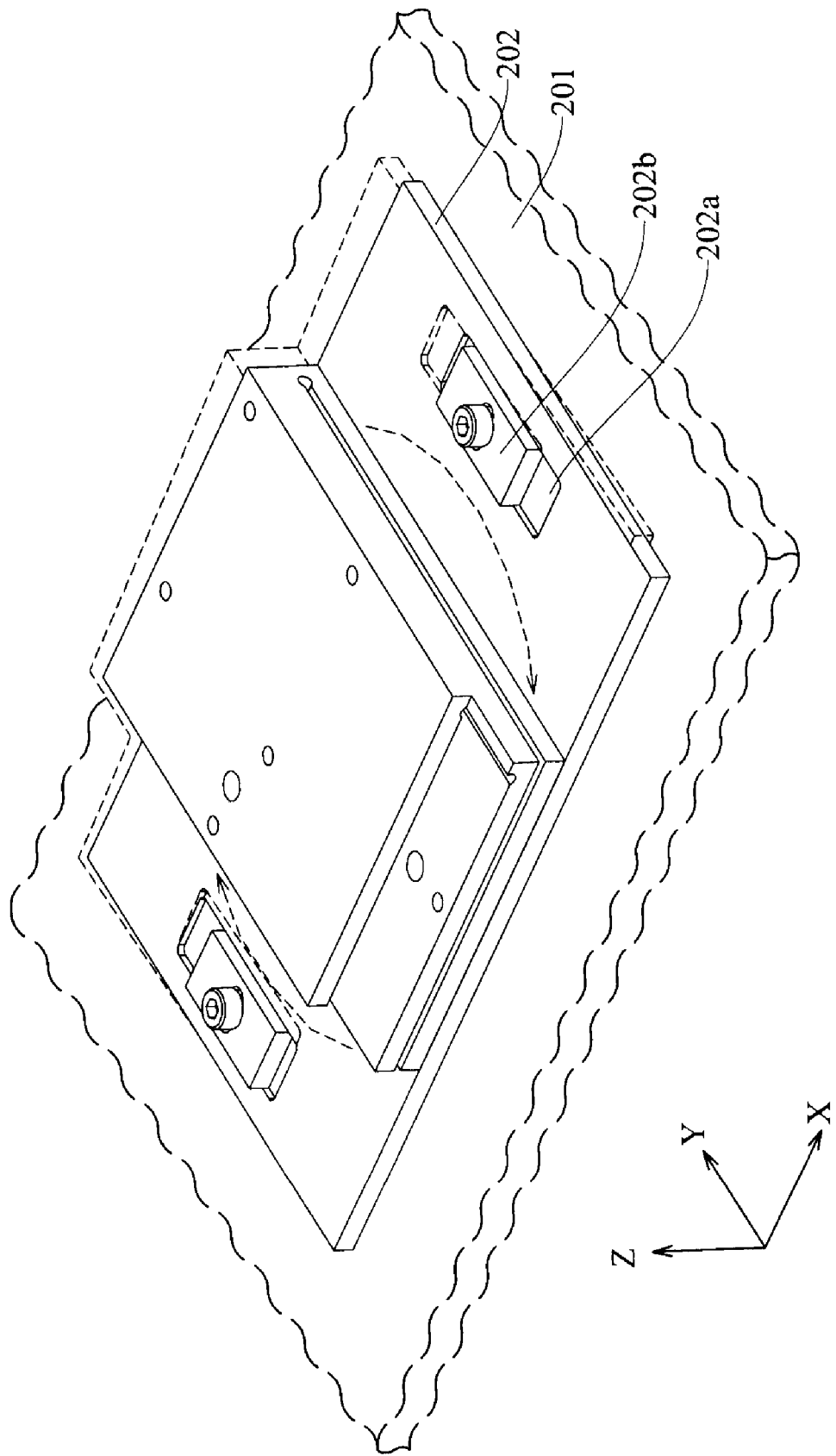
FIG. 3A is a schematic diagram illustrating the relative motion freedom(s) of the planar structure and the base by linear motion in accordance with one embodiment of the present invention.
Figure 3B:
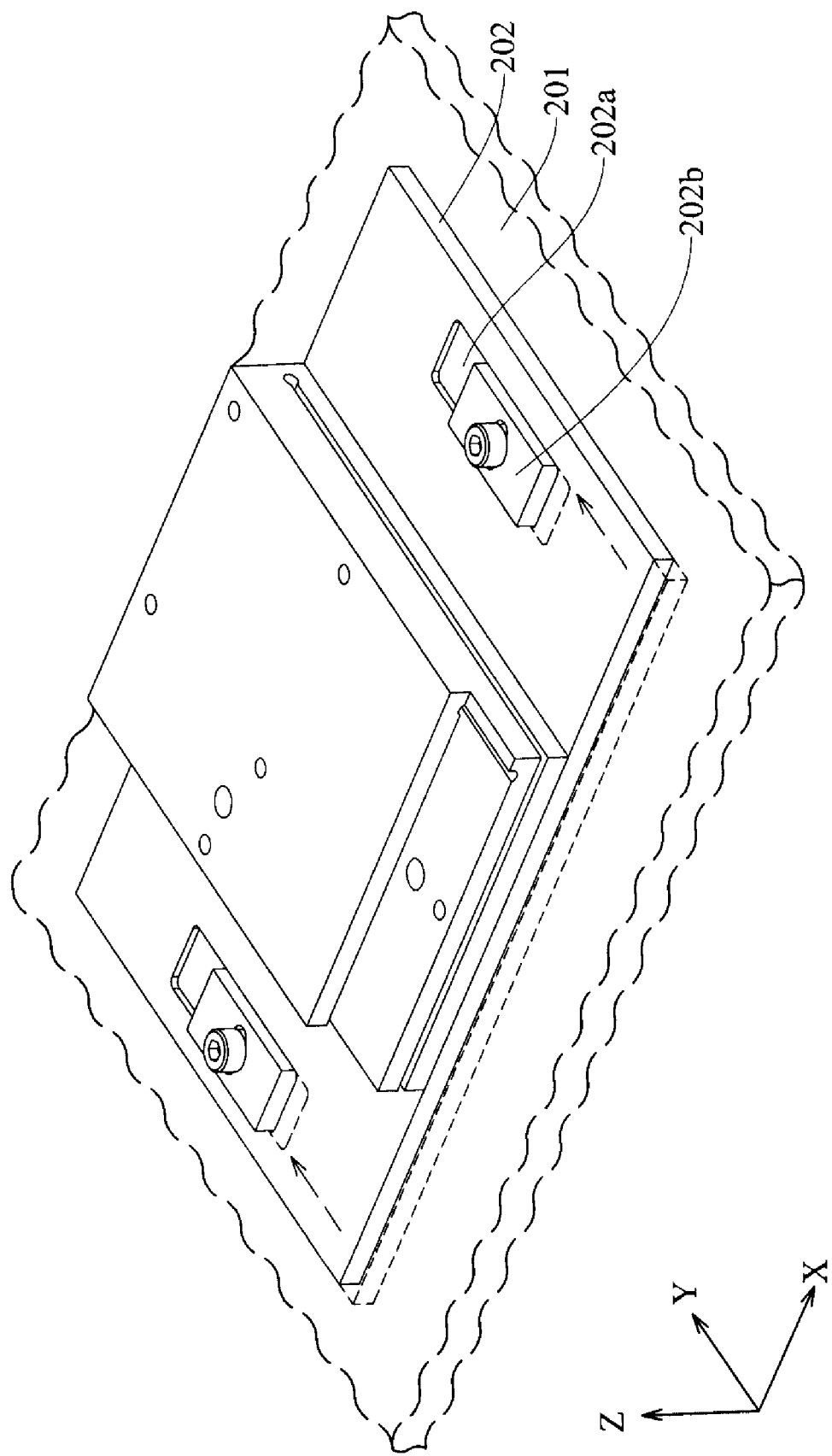
FIG. 3B is a schematic diagram illustrating the relative motion freedom(s) of the planar structure and the base by rotation in accordance with one embodiment of the present invention.

Continuing the above description, the planar structure 202 is equipped with a plurality of fasteners 202b positioned within a plurality of holes 202a respectively. It is noted that all of the holes 202a usually are not designed on only one side of the planar structure 202. For example, the holes 202a may be separately located but not limited to on the two opposite edges of the planar structure 202. Alternatively, the holes 202a may all be located but not limited to on the same edge of the planar structure 202. Moreover, the size of a hole 202a is larger than the size of a body of a fastener 202b passing through the hole 202a and is smaller than the size of an end of the fastener 202b. Clearly, when the fastener 202 is located in the hole 202a but not locked, it is allowed to move in the hole 202a (for the body of fastener 202 is narrower than the hole 202a) to provide at least one motion freedom. Of course, when the fastener 202 is located in the hole 202a and locked (because the end of the fastener 202b is wider than the hole 202a), there is no motion freedom. As an example, the shape, the size and the geometric relation of the holes 202a and the fasteners 202b are adjusted to allow the optical-electronic assembly (not shown in the figure) loaded on the elastic supporting assembly to have at least one motion freedom before all of the fasteners 202b are locked. Herein, FIG. 3A and FIG. 3B shows an embodiment with two possible motion freedoms. Herein, the two motion freedoms may be chosen from a group consisting of the following: rotation/pivot on the locked fastener 202b (the dotted arc line with an arrow), rotation/pivot on a point between the fastener 202b and the planar structure 202, linear motion along a direction parallel to a line crossing both of the holes 202a, linear motion along a direction vertical to a line crossing both of holes 202a (the dotted straight line with an arrow), and combination thereof. Thus, the planar structure 202 may be crossed with or offset from the base as shown in FIG. 3A and FIG. 3B, respectively. As an example, to provide the planar structure 202 with a significant motion freedom along the first direction 'X', the body of the fastener 202 can be made to be significantly smaller than the hole 202a along a first direction 'X' and slightly narrower than the hole 202a along a second direction 'Y.' Furthermore, as an example, the shape of each hole 202a could be chosen from a group consisting of the following: quadrangle, oblong, circle, square, and the combination thereof, and each of the fasteners 202b may be chosen from a group consisting of the following: screw with nut, nail, tack and the combination thereof.

Figure 4A:
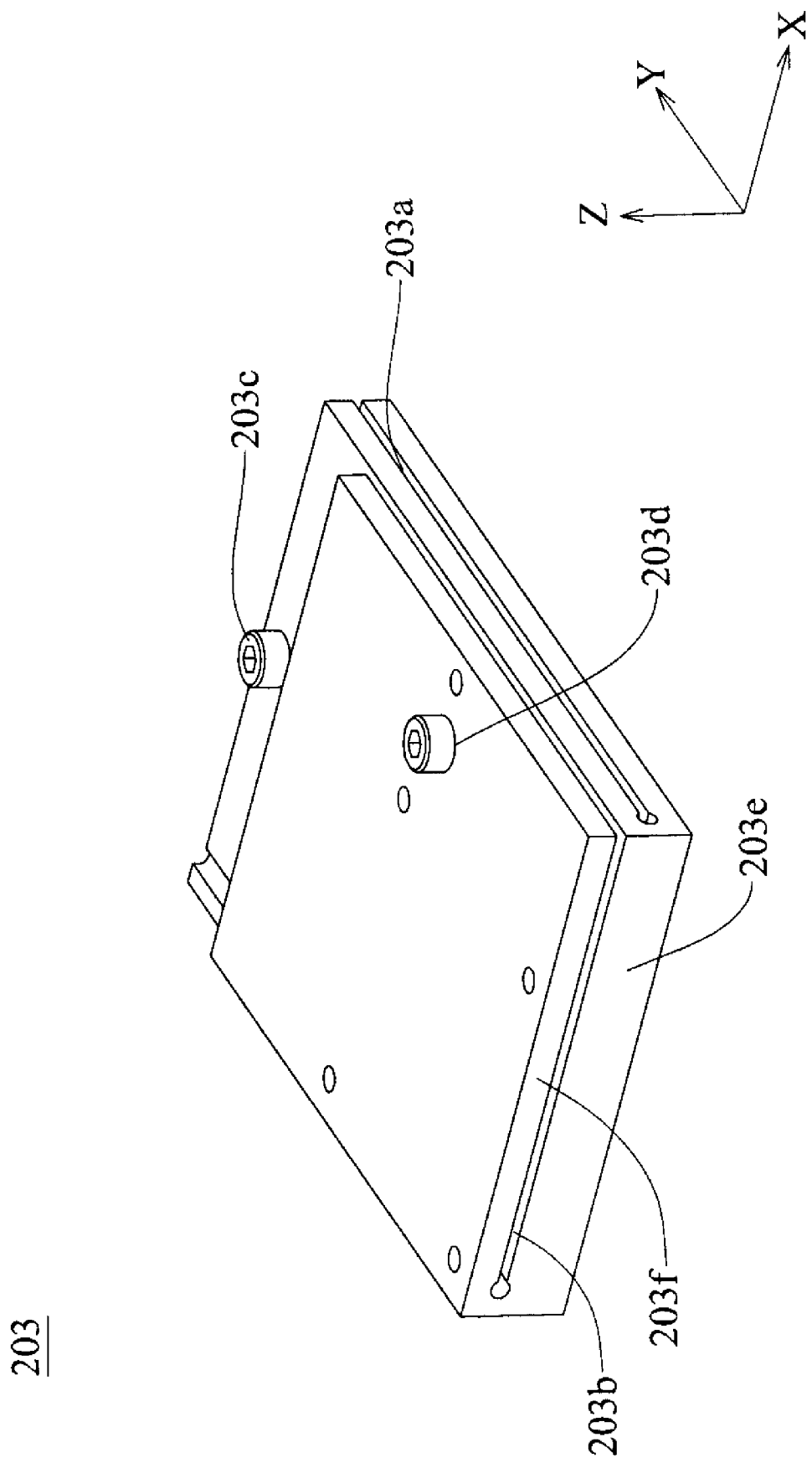
FIG. 4A is a schematic side-view diagram illustrating a cubic structure in accordance with one embodiment of the present invention.
Figure 4C:
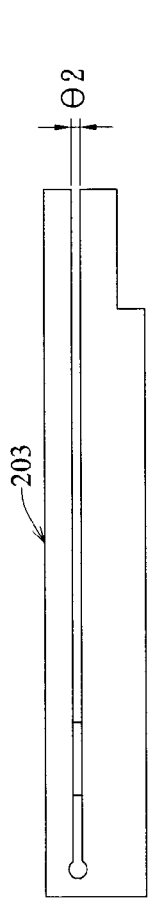
FIG. 4C is a first side view of the exemplary cubic structure in FIG. 4A.
Figure 4D:
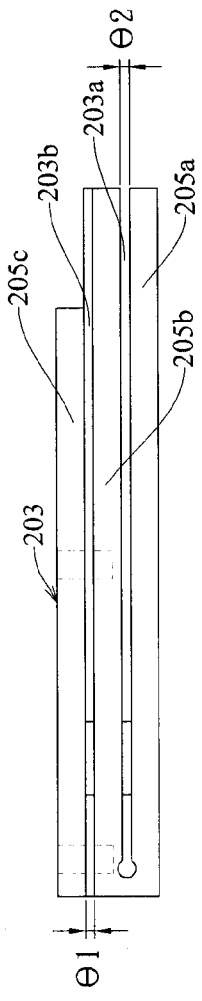
FIG. 4D is a second side view of the exemplary cubic structure in FIG. 4A.
Figure 4E:
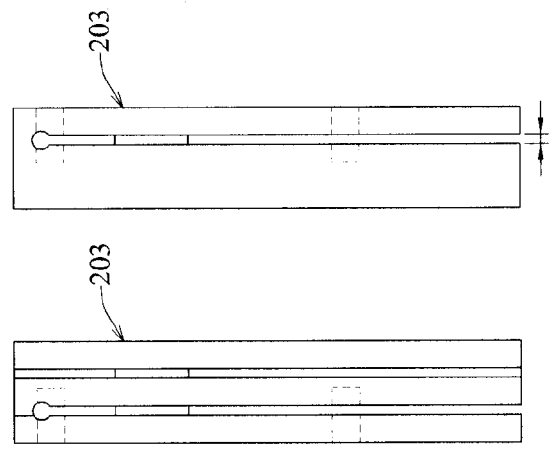
FIG. 4E is a third side view of the exemplary cubic structure in FIG. 4A.
Figure 4F:
FIG. 4F is a fourth side view of the exemplary cubic structure in FIG. 4A.
Figure 4B:
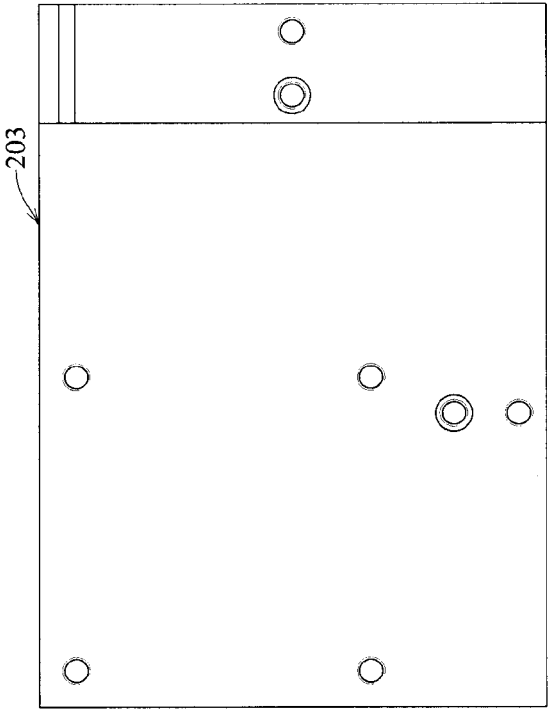
FIG. 4B is a top view of the exemplary cubic structure in FIG. 4A.

FIG. 4A is a schematic side-view diagram illustrating a cubic structure in accordance with one embodiment of the present invention. FIG. 4B is a top view, FIG. 4C is a first side view, FIG. 4D is a second side view, FIG. 4E is a third side view, and FIG. 4F is a fourth side view of the exemplary cubic structure in FIG. 4A. The cubic structure 203 is equipped with a first cavity 203a, a second cavity 203b, a first adjusting device 203c and a second adjusting device 203d. The first cavity 203a is positioned between a top plate 205b and a bottom plate 205a. The second cavity 203b is positioned between a top plate 205c and a bottom plate 205b. The corresponding adjusting device, for example, the first adjusting device 203c comprises a first fastener (not shown in the figure) capable of passing through the top plate 205b to a top surface of the second plate (plate 205a) and a second adjusting device 203d comprises a second fastener (not shown in the figure) capable of passing through the top plate 205c and the second plate 205b to reach into a hole being terminated inside the bottom plate 205a. Each of the adjusting devices (203c and 203d) could be chosen from a group consisting of the following: screw with nut, nail, tack and the combination thereof. The first fastener increases the angular magnitude of a corresponding opening when the first fastener is locked (the end of the first fastener contacts with the second plate, such that the second plate is pushed away when the first fastener is locked into the first plate), and the second fastener is capable of decreasing decreases the angular magnitude of the corresponding opening when the second fastener is locked (the end of the first fastener could be embedded into the second plate, such that the distance between the first plate and the second plate is decreased when the fastener is locked into the first plate). Further, the first portion of the cubic structure 203 forming the wall 203e of the first cavity 203a is partially overlapped with a second portion of the cubic structure forming the wall 203f of the second cavity 203b. Herein, the first cavity 203a is with a first opening oriented towards a first direction and a second cavity 203b is with a second opening oriented towards a second direction that is different from the first direction, so that the deformation induced from the first cavity and the deformation induced from the second cavity is distributed over two different planes (or together forming a 3-dimension deformation).

Referring to FIG. 4B, FIG. 4C, FIG. 4D, FIG. 4E, and FIG. 4F, the first adjusting device 203c adjusts an angular magnitude of a first angle θ1 of the first opening and the second adjusting device 203d adjusts an angular magnitude of a second angle θ2 of the second opening. The first cavity 203a and the second cavity 203b are arranged along a specific direction (for example "Z") to interact with the planar structure (not shown in the figure). Therefore, the deformation of the cubic structure 203 is not totally parallel to the top surface of the planar structure (i.e., the motion freedom(s) induced by the deformation is not totally parallel to the top surface of the planar structure). Herein, the angular magnitudes are in-measured along the specific direction.

FIG. 4G, FIG. 4H, FIG. 4I, FIG. 4J, and FIG. 4K are a top view, a first side, a second side, a third side, and a fourth side views respectively of FIG. 4A when the cubic structure is in operation in accordance with one embodiment of the present invention. In the case of compressing the angular magnitude of the second angle θ2, the first cavity 203a is compressed along the Y-Z plane. Similarly, in the case of stressing the angular magnitude of the first angle θ1, the second cavity 203b is de-compressed on the X-Z plane. According to the foregoing description in reference to FIGS. 4A to 4K, the exemplary elastic supporting assembly may provide more freedoms for the adjustment of the optical-electronic assembly to enhance the qualities and precision of the alignment for the optical-electronic assembly.

Furthermore, the cubic structure 203 could be made of elastic material or could be formed to become an elastomer or an elastic structure. According to the configuration of the cubic structure 203 aforementioned, the shape, the size and the geometric relation of the cavities (203a and 203b) cooperated with the adjusting devices (203c and 203d) are adjusted to allow the optical-electronic assembly (not shown in the figure) loaded on the elastic supporting assembly 20 in FIG. 2 to have at least one motion freedom before the adjusting devices (203c and 203d) are locked. The motion freedom is chosen from a group consisting of the following: tilting by varying the first angle θ1 of the first opening, tilting by varying the second angle θ2 of the second opening, and the combination thereof.

Accordingly, the adjustment of the relative geometric relation (such as relative position and relative angle) between the optical-electronic assembly 21 and the sample 23 may be achieved by cooperating the cubic structure 203 and the planar structure 202.

Figure 5:
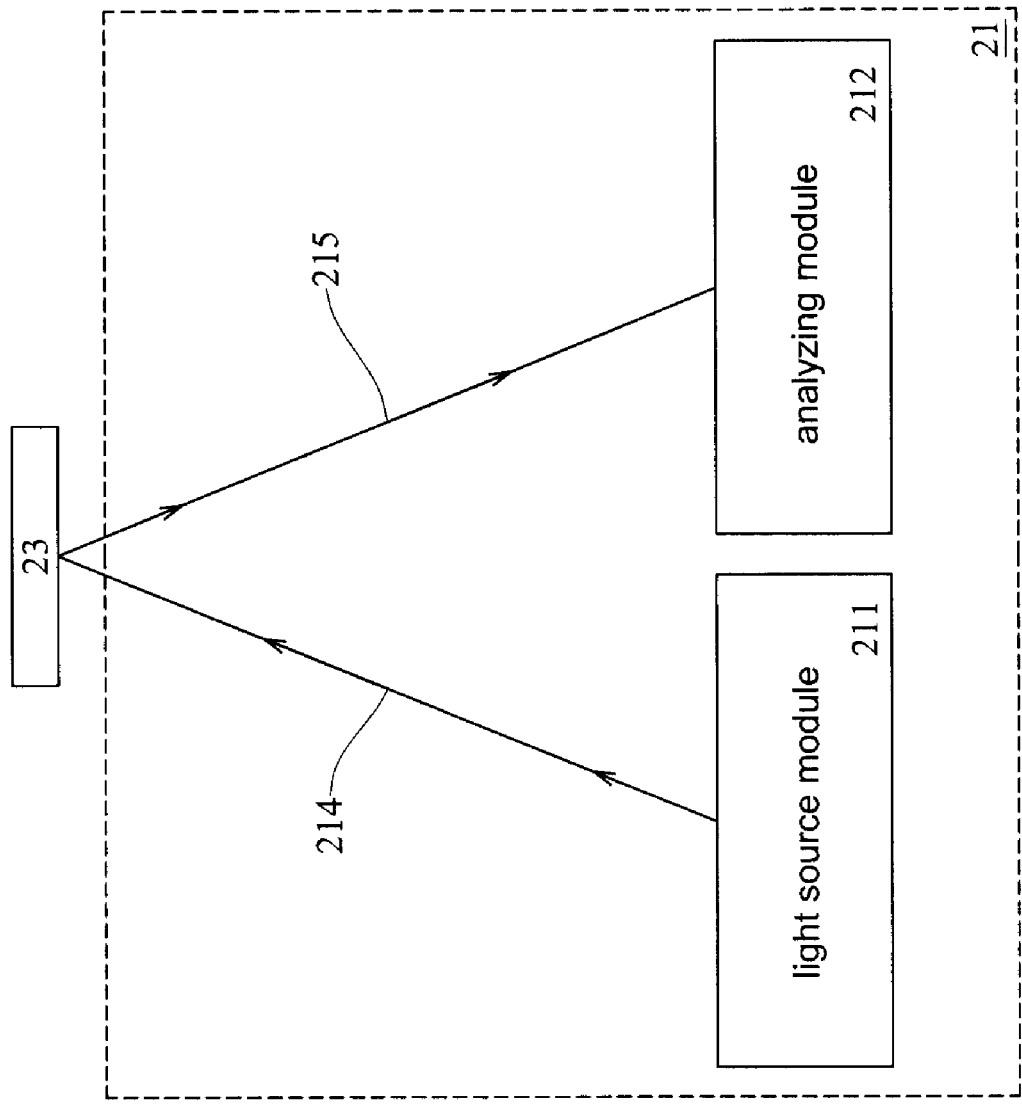
FIG. 5 is a schematic diagram illustrating an exemplary optical-electronic assembly in accordance with the present invention.

FIG. 5 is a schematic diagram illustrating an exemplary optical-electronic assembly in accordance with the present invention. The optical-electronic assembly 21 comprises a light source module 211 capable of emitting a light beam 214 to the sample 23, and an analyzing module 212 capable of analyzing a reflected light beam 215 from the sample 23.

Figure 6:
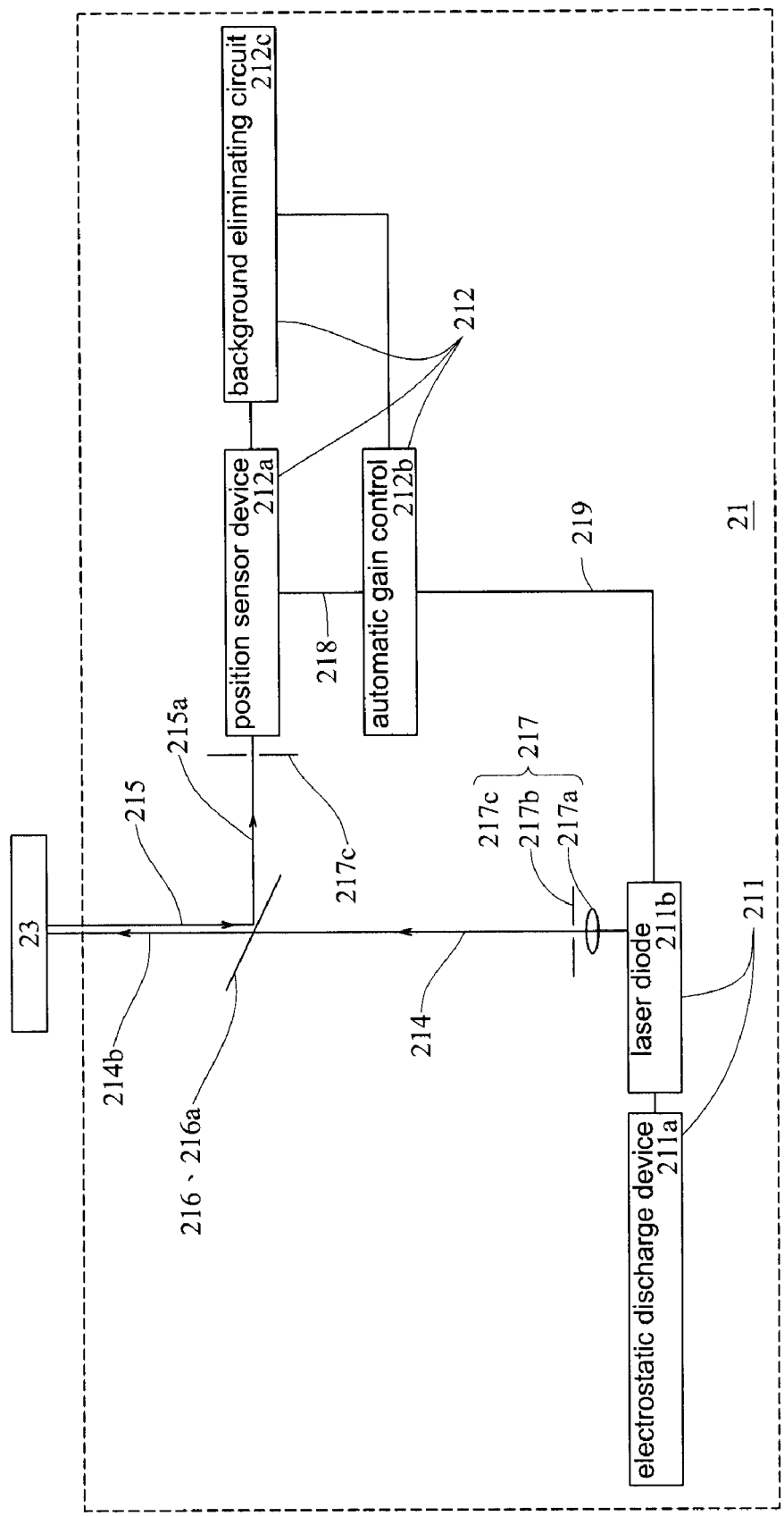
FIG. 6 is a schematic diagram illustrating an exemplary optical-electronic assembly in accordance with the present invention.

FIG. 6 is a schematic diagram illustrating an exemplary optical-electronic assembly 21 in accordance with the present invention. In the example, the light source module 211 comprises an electrostatic discharge device 211a electrically coupled with at least one external signal line that receives at least one external signal from an external environment, such that the noise (or the damages induced by electrostatic discharge) from the external environment through the external signal line is effectively blocked. Furthermore, as an example, the light source module 211 comprises a laser diode 211b driven and controlled by a laser diode driver. The laser diode 211b is configured for emitting a laser beam as the light beam 214.

Figure 7:
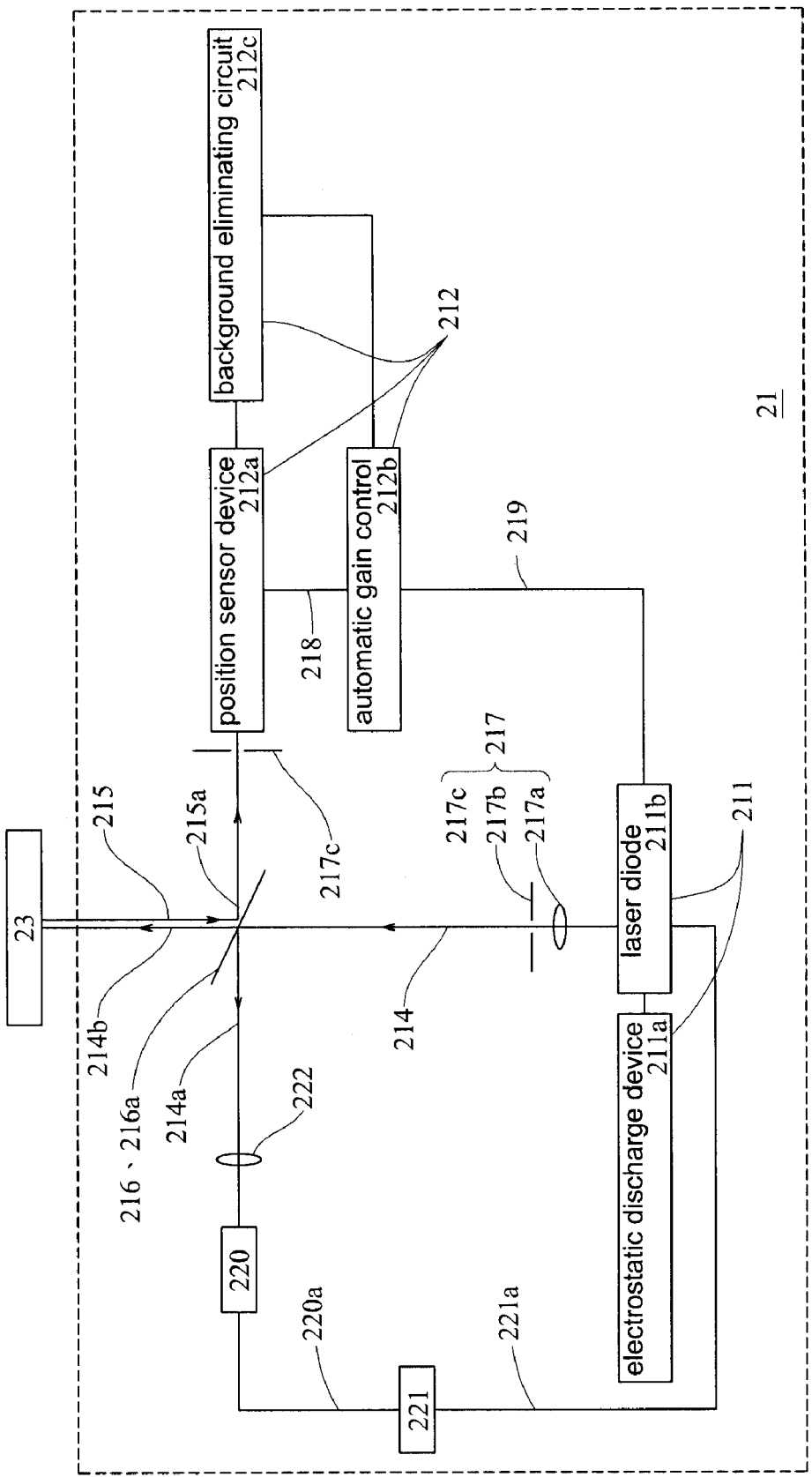
FIG. 7 is a schematic diagram illustrating an exemplary optical-electronic assembly in accordance with the present invention.
Figure 8:
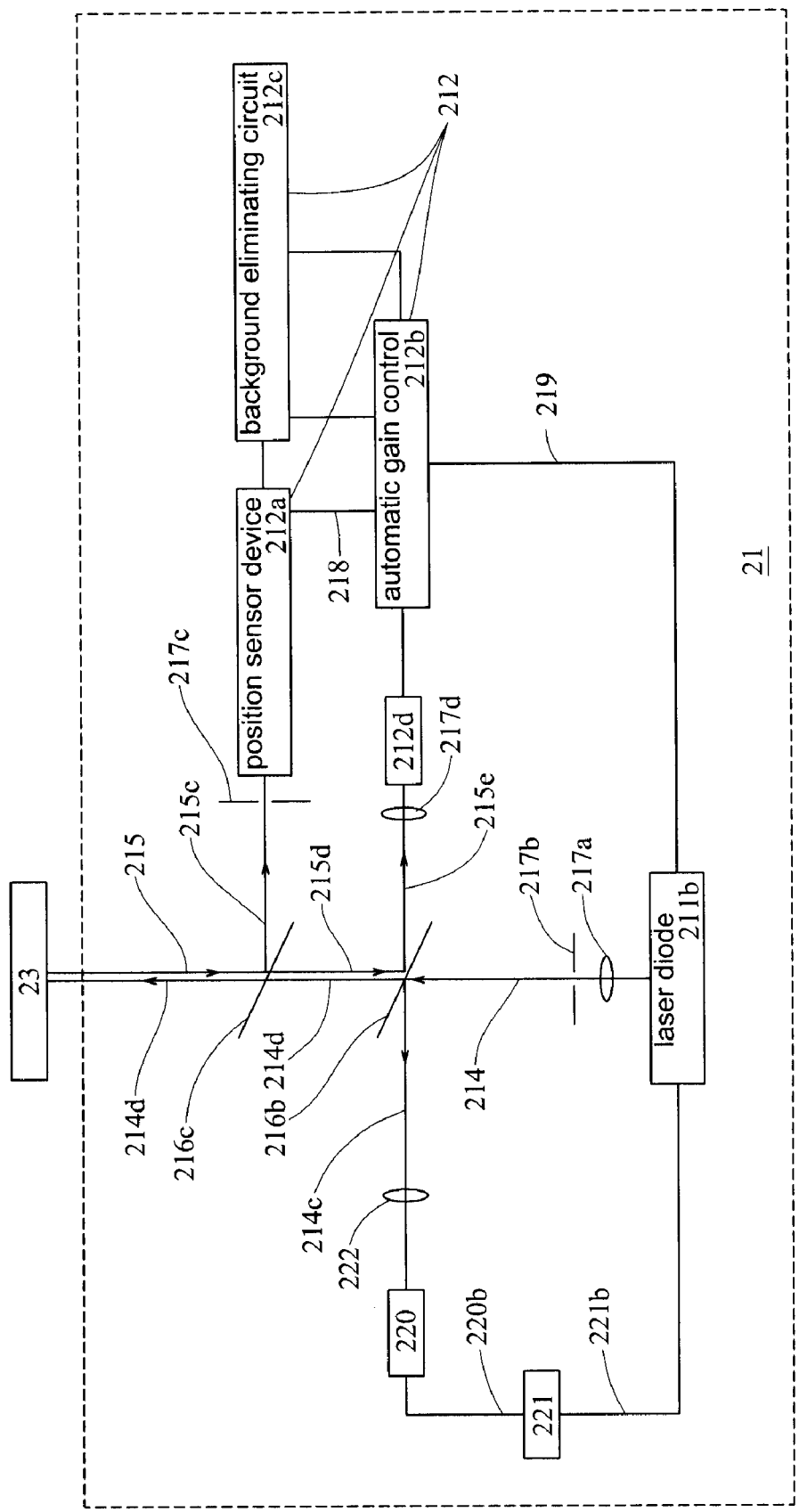
FIG. 8 is a schematic diagram illustrating an exemplary optical-electronic assembly in accordance with the present invention.

Further, the optical-electronic assembly 21 optionally comprises a beam splitting module 216 capable of splitting the light beam 214 and the reflected light beam 215. The beam splitting module 216 could be positioned between the sample 23 and the light source module 211, and/or between the sample 23 and the analyzing module 212. As one example, as shown in FIG. 7, the beam splitting module 216 comprises a first beam splitter 216a which reflects the first portion 214a of the light beam 214 and reflects the first portion 215a of the reflected light beam 215, and allows the second portion 214b of the light beam 214 to pass through for projecting on the sample 23 and forms the reflected light beam 215. As another example, as shown in FIG. 8, the beam splitting module 216 may comprise a second beam splitter 216b and a third beam splitter 216c located separately and in sequence between the light source module 211 and the sample 23. The second portion 214c of the light beam 214 is reflected by the second beam splitter 216b. The third portion 214d of the light beam 214 passes through the second beam splitter 216b and the third beam splitter 216c and projects on the sample 23 to form the reflected light beam 215. Then the first portion 215c of the reflected light beam 215 is reflected by the third beam splitter 216c, the second portion 215d of the reflected light beam 215 passes through the third beam splitter 216c and the third portion 215e of the reflected light beam 215 is reflected by the second beam splitter 216b. Different light splitting modules 216 correspond to different designs of the optical-electronic assembly 21, especially correspond to different designs of the analyzing module 212.

Next, as an example, the analyzing module 212 comprises a position sensor device 212a and an automatic gain control (AGC) circuit 212b coupled with the position sensor device 212a as shown in FIG. 6 or coupled with a first detector 212d capable of receiving the third portion 215e of the reflected light beam 215 as shown in FIG. 8. The position sensor device 212a the first portion 215a of the reflected light beam 215 and outputs a processed detected signal 218 which is a function of both the incident angle of the second portion 214b of the light beam 214 on the sample 23 and a projected position of the second portion 214b of the light beam 214 on the sample 23. Herein, by using proper position sensor device 212, such as a commercial position sensor device 212 having four detectors for providing quadrantal detection independently, it is easy to decide whether the second portion 214b of the light beam 214 is properly projected on the sample 23 and whether the sample 23 is properly located on the predetermined position with predetermined angle. The automatic gain control circuit 212b outputs an adjusting signal 219 to the light source module 211 according to a light intensity of the first portion 215a of the reflected light beam 215 or the third portion 215e of the reflected light beam 215. Then, by referring to the output of the automatic gain control circuit 212b, the light source module 211 decreases the light intensity of the light beam 214 when the light intensity of the light beam 214 is larger than a higher threshold. Similarly, the light source module 211 increases the light intensity of the light beam 214 when the light intensity of the light beam 214 is smaller higher than a lower threshold. Thus, the light source module 211 adjusts the light intensity of the light beam 214 according to the adjusting signal 219, such that the light intensity of the first portion 215a of the reflected light beam 215 could be optimal for proper operation of the analyzing module 212.

Furthermore, as an example, the analyzing module 212 may further comprise a background eliminating circuit 212c electrically coupled with the position sensor device 212a. The background eliminating circuit 212c eliminates the effect of a background light which is received with the first portion 215a of the reflected light beam 215 by the position sensor device 212a simultaneously. There are different approaches to achieve the object of the background eliminating circuit 212c, based on the fact that the light source module 211 usually use laser as the light source. According to a first example, the background eliminating circuit 212c filters to obtain the required first portion 215a of the reflected light beam 215 by only allowing a portion of the received light within specific frequencies (corresponding to the frequencies of the light source module 211) to pass and blocking the other portion of the received light. According to a second example, background eliminating circuit 212c divides the received light into a continuous portion which spans over continuous frequencies (corresponding to the backlight) and a discrete portion which discretely distributes only within some specific frequencies (corresponding to the reflected light). Then, the background eliminating circuit 212c also produces a simulated light which is essentially out-phase with the continuous portion over all frequencies, such that the continuous portion is cancelled by the simulated light and only the discrete portion is passed.

Furthermore, as an example shown in FIG. 7, for properly adjusting the light intensity of the light beam 214 with reference to the reflected portion of the light beam 214 and the operation of the light source module 211, the optical-electronic assembly 21 may further comprise a photo receiver 220 capable of receiving the first portion 214a of the light beam 214 and producing a corresponding output signal 220a. A focus lens 222 may be optionally set for focusing the first portion 214a of the light beam 214 on the photo receiver 222. Optionally, the a power limitation circuit 221 produces a power limitation signal 221a according the output signal 220a (which is detected) and a reflection-transmission ratio of the first beam splitter 216a (which is known when a specific beam splitter is used to form the first beam splitter 216a). The power limitation signal 221a is proportional to the actual intensity of the light beam 214. according to which the light source module 211 adjusts the light intensity of the light beam 214. For example, to avoid the risk that only a very small portion of the second portion 214b of the light beam 214 is reflected (the sample 23 might have a very low reflection coefficient) and then the automatic gain control (AGC) circuit 212b generates the adjusting signal 219 driving the light source module 211 to overly increase the light intensity of the light beam 214, the power limitation signal 221a could be used to restrict the adjusted light intensity of the light beam 214 to be smaller than or equal to a maximum allowable light intensity of the light source module 211.

Alternatively, as shown in FIGS. 5~8, the optical-electronic assembly 21 may comprise a light adjusting module 217 capable of adjusting the propagation of the light beam 214 and the reflected light beam 215. The light adjusting module 217 may be positioned between the sample 23 and the light source module 211, and/or between the sample 23 and the analyzing module 212. In one example, the light adjusting module 217 comprises a collimator lens 217a capable of adjusting propagation of the light beam 214 for ensuring propagation of the light beam 214 with less divergence. The light adjusting module 217 may comprise a first plate 217b with a first aperture for ensuring the uniform light intensity of the light beam 214 within a specific cross-sectional area, such that only essentially parallel light is projected on the sample 23 (or such that only incident light within a specific cross-section area and with a specific light strength intensity could pass through the first plate 217b). The light adjusting module 217 may further comprise a second plate 217c with a second aperture for ensuring the uniform light intensity of the reflected light beam 215 within a specific cross-sectional area (e.g. only incident light within a specific cross-section area and with a specific light intensity could pass through the second plate 217c). Hence, if the sample 23 is significantly improperly located (such as the sample 23 is far away from the predetermined position or the sample 23 is significantly tilted), the reflected light beam 215 will be blocked by second plate 217c and then the light adjusting module 217 will receive no light, such that it easily finds the significantly displacement of the sample 23. Alternatively, the light adjusting module 217 may further comprises a first focusing lens 217d located between the second beam splitter 216b and the first detector 212d, which focuses the third portion 215e of the reflected light beam 215 into the first detector 212d.

The optical-electronic assembly means an assembly of the optical device, optoelectronic device and the electronic device. In one embodiment of the present invention, the optical-electronic assembly 21, as shown in FIG. 6 to FIG. 8, may include an optical device including the light adjusting module 217 and the beam splitting module 216, an optoelectronic device including the laser diode 211b and the position sensor device 212a, and an electronic device including the electrostatic discharge device 211a, the automatic gain control (AGC) circuit 212b and the background eliminating circuit 212c Although the present invention has been explained in relation to some embodiments, it is to be understood that other modifications and variation can be made without departing the spirit and scope of the invention as hereafter claimed.

What is claimed is:

1. A system for detecting a sample, comprising:
a holding apparatus for holding the sample; and
at least one detecting apparatus separated from said sample, projecting a light beam on said sample and detecting a geometric condition of said sample, wherein said detecting apparatus comprises:
an optical-electronic assembly projecting a light beam on said sample, receiving a reflected light beam from said sample and analyzing said reflected light beam; and
an elastic supporting assembly supporting said optical-electronic assembly, fixing said optical-electronic assembly to a base and adjusting a relative geometric relation between said optical-electronic assembly and said sample.

2. The system as claimed in claim 1, wherein said optical-electronic assembly comprises:
a light source module emitting said light beam to said sample; and
an analyzing module analyzing said reflected light beam.

3. The system as claimed in claim 1, wherein said elastic supporting assembly comprises:
a planar structure having holes separately located on at least one edge of said planar structure, wherein a size of each of said holes is larger than a size of a body of a fastener passing through said hole and is smaller than a size of an end of said fastener; and
a cubic structure contacting with said planar structure, said cubic structure having a first and a second cavities and a first and a second adjusting devices, wherein said first cavity having a first opening oriented towards a first direction and said second cavity having a second opening oriented towards a second direction that is different from said first direction, wherein said first adjusting device adjusts an angular magnitude of a first angle of said first opening and said second adjusting device adjusts an angular magnitude of a second angle of said second opening, wherein said first and second cavities are arranged along a specific direction to interact with said planar structure and said angular magnitudes are measured along said specific direction.

4. The system as claimed in claim 1, when said sample has a first edge, a second edge and a third edge that crossing a specific vertex of said sample, further comprising a first said detecting apparatus being located such that a first said light beam is projected on a first plane defined by said first edge and said second edge and a second said detecting apparatus being located such that a second said light beam is projected on a second plane defined by said first edge and said third edge, wherein said first edge and said second edge is the same edge if a shape of said first plane is chosen from a group consisting of the following: circle, ellipse, oval, and combination thereof.

5. An apparatus for detecting a sample, comprising:
an optical-electronic assembly projecting a light beam on a sample, receiving a reflected light beam from said sample and analyzing said reflected light beam; and
an elastic supporting assembly supporting said optical-electronic assembly, fixing said optical-electronic assembly to a base and adjusting a relative geometric relation between said optical-electronic assembly and said sample, said elastic supporting assembly comprising:
a planar structure having holes separately located on at least one edge of said planar structure, wherein the size of each said hole is larger than the size of a body of a fastener passing through said hole and is smaller than the size of an end of said fastener; and
a cubic structure contacting with said planar structure, said cubic structure having at least two cavities and at least two adjusting devices, wherein a first cavity having a first opening oriented towards a first direction and said second cavity having a second opening oriented towards a second direction that is different than said first direction, wherein a first adjusting device adjusts an angular magnitude of a first angle of said first opening and a second adjusting device adjusts an angular magnitude of a second angle of said second opening, wherein said cavities are arranged along a specific direction to interact with said planar structure and said angular magnitudes are measured along said specific direction.

6. The apparatus as claimed in claim 5, wherein the relation between said planar structure and said cubic structure is chosen from a group consisting of the following:
the area between said planar structure and said base is larger than the area between said cubic structure and said planar structure, when said planar structure is located on said base and said cubic structure is located on said planar structure; and
the area between said cubic structure and said base is larger than the area between said planar structure and said cubic structure, when said cubic structure is located on said base and said planar structure is located on said cubic structure.

7. The apparatus as claimed in claim 5, wherein the shape, the size and the geometric relation of said holes said fasteners are adjusted to allow said optical-electronic assembly supported by said elastic supporting assembly to have at least one motion freedom before all said fasteners are locked, said motion freedom being chosen from a group consisting of the following: rotate around a locked said fastener, rotate around a point located between said fastener and on said planar structure, move along a direction which is parallel to a line crossing both said holes, move along a direction which is vertical to a line crossing both said holes, and combination thereof.

8. The apparatus as claimed in claim 5, wherein said holes are significantly wider than said fasteners along a first direction and are slightly wider than said fasteners along a second direction, so that said planar structure has a significant motion freedom along said first direction.

9. The apparatus as claimed in claim 5, wherein said holes are separately located on two opposite edges of said planar structure.

10. The apparatus as claimed in claim 5, wherein said cubic structure is made of elastic material.

11. The apparatus as claimed in claim 5, wherein the shape, the size and the geometric relation of said cavities and said adjusting devices are adjusted to allow said optical-electronic assembly supported by said elastic supporting assembly to have at least one motion freedom before said adjusting devices are locked, said motion freedom being chosen from a group consisting of the following: tilting by varying said first angle of said first opening, tilting by varying said second angle of second opening, and combination thereof.

12. The apparatus as claimed in claim 5, wherein a first portion of said cubic structure forming the wall of said first cavity is at most partially overlapped with a second portion of said cubic structure forming the wall of said second cavity.

13. The apparatus as claimed in claim 5, wherein one of said cavity is located between a top plate and a bottom plate, and said corresponding adjusting device comprises a first fastener passing through said top plate to a top surface of said second plate and a second fastener passing through said top plate and said top surface of second plate to reach a hole being terminated inside said bottom plate.

14. The apparatus as claimed in claim 13, wherein said first fastener increases the angular magnitude of a corresponding opening when said first fastener is locked, and said second fastener decreases the angular magnitude of said corresponding opening when said second fastener is locked.

15. An apparatus for detecting a sample, comprising:
an optical-electronic assembly for projecting a light beam on a sample, receiving a reflected light beam from said sample and analyzing said reflected light beam; and
an elastic supporting assembly for supporting said optical-electronic assembly, fixing said optical-electronic assembly to a base and adjusting the relative position between said optical-electronic assembly and said sample;
wherein said optical-electronic assembly comprises:
a light source module emitting said light beam to said sample; and
an analyzing module, receiving and analyzing said reflected light beam.

16. The apparatus as claimed in claim 15, wherein said light source module comprises an electrostatic discharge device being electrically coupled with at least one external signal line that receives at least one external signal from an external environment.

17. The apparatus as claimed in claim 16, wherein said optical-electronic assembly comprises a light adjusting module adjusting the propagation of said light beam and said reflected light beam, said light adjusting module being located between said light source module and said sample, or between said sample and said analyzing module.

18. The apparatus as claimed in claim 17, wherein said light adjusting module comprises at least one of the following:
a collimator lens for adjusting a propagation of said light beam such that said propagation of said light beam is essentially not divergent;
a first plate with a first aperture, such that at most a specific portion of said light beam is passed, wherein said specific portion of said light beam has a specific cross-sectional area and a specific light intensity; and
a second plate with a second aperture, such that at most a specific portion of said reflected light beam is passed, wherein said specific portion of said reflected light beam has a specific cross-sectional area and a specific light intensity.

19. The apparatus as claimed in claim 15, wherein said optical-electronic assembly comprises a beam splitting module splitting said light beam and said reflected light beam, said beam splitting module being located between said sample and light source module, or between said sample and said analyzing module.

20. The apparatus as claimed in claim 19, wherein said beam splitting module comprises a first beam splitter, said first beam splitter reflecting a first portion of said light beam and reflecting a first portion of said reflected light beam, and said first beam splitter also allowing a second portion of said light beam to pass through and project on said sample such that said reflected light beam is formed.

21. The apparatus as claimed in claim 20, wherein said analyzing module comprises a position sensor device receiving said first portion of said reflected light beam and outputting a processed detected signal which is a function of both an incident angle of said second portion of said light beam on said sample and a projected position of said second portion of said light beam on said sample.

22. The apparatus as claimed in claim 21, wherein said analyzing module comprises an automatic gain control circuit electrically coupled with said position sensor device, said automatic gain control circuit outputting an adjusting signal according to a light intensity of said first portion of said reflected light beam.

23. The apparatus as claimed in claim 22, wherein said automatic control circuit outputs said adjusting signal to said light source module, such that said light source module decreases said light intensity of said light beam when said light intensity of said light beam is larger than a higher threshold, and also such that said light source module increases said light intensity of said light beam when said light intensity of said light beam is smaller higher than a lower threshold.

24. The apparatus as claimed in claim 20, further comprising a photo receiver and a power limitation circuit, said photo receiver receiving said first portion of said light beam and producing a corresponding output signal, said power limitation circuit producing a power limitation signal according said output signal and a reflection-transmission ratio of said first beam splitter, such that said light source module restricts the light intensity of said beam light to be smaller than or equal to a maximum allowable light intensity of said light source module.

25. The apparatus as claimed in claim 20, wherein said analyzing module comprises a background eliminating circuit electrically coupled with said position sensor device, said background eliminating circuit eliminating the effect of a background light which is received with said reflected light beam by said position sensor device simultaneously.

26. The apparatus as claimed in claim 25, wherein said background eliminating circuit performs one of the following:
filtering a received light which is a combination of said background light and said reflected light beam, such that only a specific portion of a received light with some specific frequencies is passed and other portion of said received light with other frequencies is filtered out, wherein said specific frequencies corresponds to the frequencies of said light beam; and
analyzing a received light which is a combination of said reflected light beam and said background light, said background eliminating circuit dividing said received light into a continuous portion which spans over all frequencies and a discrete portion which distributes only on some specific frequencies, said background eliminating circuit also producing a simulated light which is essentially out-phase with said continuous portion over all frequencies, such that said continuous portion is cancelled by said simulated light and only said discrete portion is passed, wherein said specific frequencies corresponds to the frequencies of said light beam.

27. The apparatus as claimed in claim 20, wherein said beam splitting module comprises a second beam splitter and a third beam splitter, said second beam splitter and said third beam splitter being located separately and in sequence between said light source module and said sample, such that a second portion of said light beam is reflected by said second beam splitter and a third portion of said light beam pass through said second beam splitter, also such that said third portion of said light beam pass through said third beam splitter and projects on said sample to form said reflected light beam, also such that a first portion of said reflected light beam is reflected by said third beam splitter and a second portion of said reflected light beam passes through said third beam splitter, and also such that a third portion of said reflected light beam is reflected by said second beam splitter.

28. The apparatus as claimed in claim 27, wherein said analyzing module comprises a position sensor device receiving said first portion of said reflected light beam and outputting a processed detected signal which is a function of both an incident angle of said third portion of said light beam on said sample and a projected position of said third portion of said light beam on said sample.

29. The apparatus as claimed in claim 27, wherein said analyzing module comprises an automatic gain control circuit electrically coupled with a first detector receiving said second portion of said reflected light beam, said automatic gain control circuit being outputting an adjusting signal according to a light intensity of said second portion of said reflected light beam.

30. The apparatus as claimed in claim 29, wherein said automatic control circuit outputs said adjusting signal to said light source module, such that said light source module decreases said light intensity of said light beam when said light intensity of said light beam is larger than a higher threshold, and also such that said light source module increases said light intensity of said light beam when said light intensity of said light beam is smaller higher than a lower threshold.

31. The apparatus as claimed in claim 27, further comprising a photo receiver and a power limitation circuit, said photo receiver receiving said first portion of said light beam and producing a corresponding output signal, said power limitation circuit producing a power limitation signal according said output signal and a reflection-transmission ratio of said first beam splitter, such that said light source module restricting the light intensity of said beam light to be smaller than or equal to a maximum allowable light intensity of said light source module.

32. The apparatus as claimed in claim 27, wherein said analyzing module comprises a background eliminating circuit electrically coupled with said position sensor device, said background eliminating circuit eliminating the effect of a background light which is received with said first portion of said reflected light beam by said position sensor device simultaneously.

33. The apparatus as claimed in claim 32, wherein said background eliminating circuit performs at least one of the following:

filtering a received light which is a combination of said background light and said first portion of said reflected light beam, such that only a specific portion of said received light with some specific frequencies is passed and other portion of said received light with other frequencies is filtered out, wherein said specific frequencies corresponds to the frequencies of said light beam; and analyzing a received light which is a combination of said background light and said first portion of said reflected light beam, said background eliminating circuit dividing said received light into a continuous portion which spans over all frequencies and a discrete portion which distributes only on some specific frequencies, said background eliminating circuit also producing a simulated light which is essentially out-phase with said continuous portion over all frequencies, such that said continuous portion is cancelled by said simulated light and only said discrete portion is passed, wherein said specific frequencies corresponds to the frequencies of said light beam.

34. An apparatus for detecting geometric conditions of a sample, comprising:
  an optical-electronic assembly for projecting a light beam on the sample, receiving and analyzing a reflected light beam from the sample; and
  an elastic supporting assembly for mounting the optical-electronic assembly and adjusting the optical-electronic assembly to determine an orientation of the sample, said elastic supporting assembly including a top surface for mounting said optical-electronic assembly, a first means for tilting the top surface in a first direction, and a second means for tilting the top surface in a second direction, wherein the first direction is different to the second direction.

35. The apparatus of claim 34, wherein the optical-electronic assembly comprises a light source module for emitting the light beam to the sample, and an analyzing module for analyzing the reflected light beam.

36. The apparatus of claim 34, wherein the elastic supporting assembly comprises:
  a planar structure with holes separately located on at least one edge of the planar structure, wherein one size of each of said holes is larger than a size of a body of a fastener passing through said hole and is smaller than a size of an end of said fastener; and
  a cubic structure contacting with the planar structure and having a first and a second cavities and a first and a second adjusting devices, wherein said first cavity having a first opening oriented towards the first direction and said second cavity having a second opening oriented towards the second direction, wherein said first adjusting device adjusts an angular magnitude of a first angle of said first opening and said second adjusting device adjusts an angular magnitude of a second angle of said second opening, wherein said first and second cavities are arranged along a specific direction to interact with said planar structure and said angular magnitudes are measured along said specific direction.

* * * * *